Nov. 18, 1947.  C. R. WAGNER  2,431,216
PRODUCTION OF ALKENYLFURANS
Filed Dec. 6, 1943
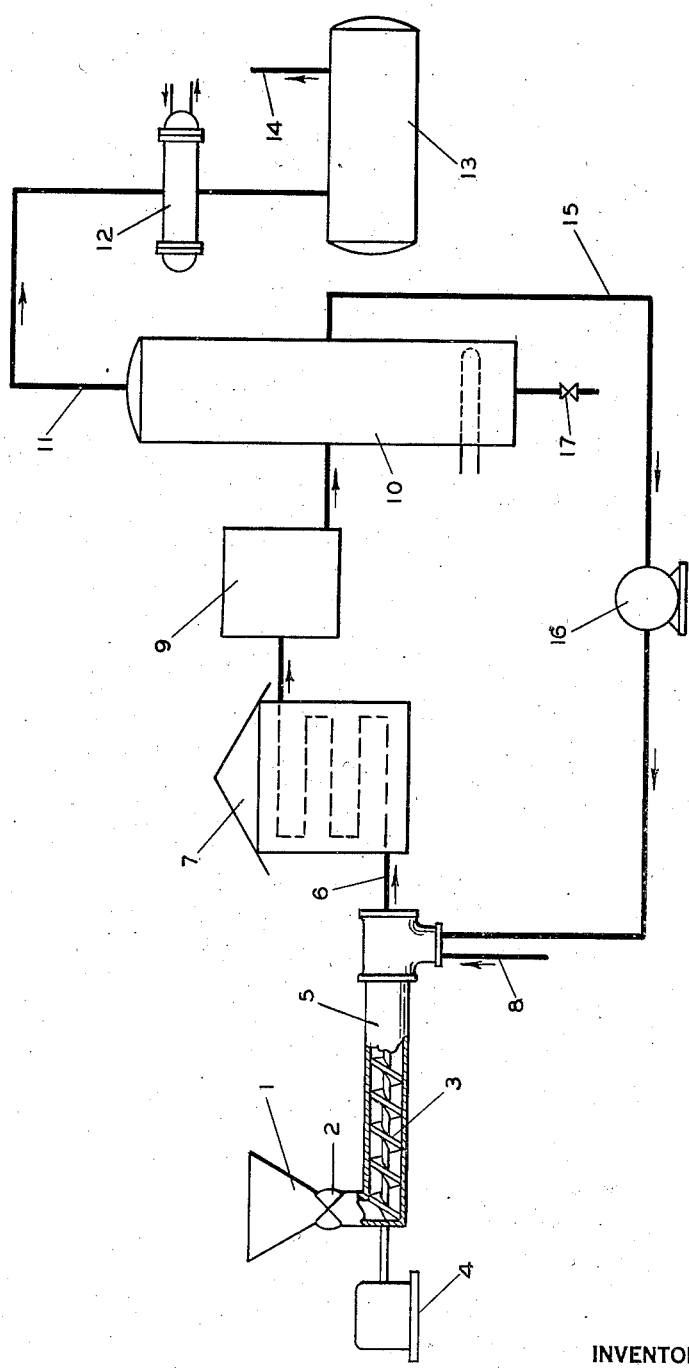
INVENTOR
C. R. WAGNER
BY Hudson, Young and Ginger
ATTORNEYS Patented Nov. 18, 1947

2,431,216

UNITED STATES PATENT OFFICE 2,431,216

PRODUCTION OF ALKENYLFURANS

Cary R. Wagner, Utica, Ohio, assignor to Phillips Petroleum Company, a corporation of Delaware Application December 6, 1943, Serial No. 513,094

5 Claims. (Cl. 260—345)

1

The present invention relates to the production of alkenylfurans or furylalkenes, and more particularly to the production of 2-vinylfuran or alpha-furyl-ethylene. The process of the invention is an improved continuous process for the production of 2-vinylfuran and similar alkenylfurans by the decarboxylation of 2-furanacrylic acid and similar furanalkenyl carboxylic acids.

2-vinylfuran or alpha-furylethylene is an oily liquid having a boiling point of 99° to 101° C. at a pressure of 760 mm. of mercury and a melting point of −94° C. It is very readily polymerized and resinified by heat and by catalysts such as acids, acetyl chloride, silicon tetrachloride, stannic chloride, antimony pentachloride and similar acid-reacting compounds.

2-vinylfuran has heretofore been prepared by the decarboxylation of 2-furanacrylic acid in accordance with the following equation:

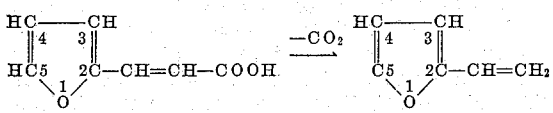

The decarboxylation has been effected by heating 2-furanacrylic acid but the yields have been low. Marckwald (Berichte, 1887, vol. 20, page 2812) found that on rapid distillation of small quantities of 2-furanacrylic acid the compound could be volatilized without decomposition and reported its boiling point to be 226° C. and noted that it readily sublimed at 100° C. Liebermann (Berichte, 1894, vol. 27, page 286) found that by heating the compound slowly on a sand bath (255° to 265° C.) with reflux, that it decomposed to 2-vnylfuran; from 4 grams of 2-furanacrylic acid he obtained 1.1 grams of 2-vinylfuran.

In order to improve the yield of 2-vinylfuran from the thermal decomposition or decarboxylation of 2-furanacrylic acid, Moureu, Dufraisse and Johnson (Annales chim. phys., 1927, Series 10, vol. 7, pages 14 to 42) made a systematic study of the reaction. They obtain, as their best yield, an average of 40% of the theoretical yield, that is, from 710 grams of 2-furanacrylic acid they obtained 192 grams of 2-vinylfuran. Metals, tertiary amines, silica and other catalytic materials were tried for the purpose of lowering the temperature of decarboxylation, and thereby reducing concomitant thermal polymerization, but

2 these materials were ineffective. They also tried dry distillation of barium, copper, sodium and lead salts of 2-furanacrylic acid, respectively, alone as well as in the presence of alkalies, as alternative methods but obtained only mediocre results. As a result of their investigations, it was found that it was not advantageous to use large quantities in the decomposition and they adopted the following procedure for the production of 2-vinylfuran:

Into a 25 x 160 mm. Pyrex glass tube provided with a side arm or tube joined to a condenser are placed 5 grams of furanacrylic acid that has been dried over sulfuric acid. Pure acid, they found, gives better yields but the losses resulting from the purification treatment are not compensated by the gain in yield. The condenser is provided with an adapter which is joined to a test tube into which a small quantity of an antioxidant (hydroquinone) has previously been placed. The reaction tube is plunged to a depth of 45 to 50 mm. into an oil bath that is heated to 270° to 280° C. (the oil may be heated to as high as 320° C.). After several minutes the acid melts, and there is soon a slow evolution of gas and organic vapors that condense in the condenser, while the vapors of furanacrylic acid are condensed on the walls of the tube. When tubes of the specified dimensions are used, the side tube does not become plugged with furanacrylic acid. A cloudy liquid collects continuously in the receiver tube; after 30 to 40 minutes no further material distills. During this operation the temperature of the oil bath is raised gradually to 300° to 320° C. The distillate consists essentially of a mixture of water and 2-vinylfuran; the quantity of the latter which can be obtained starting from 5 grams of furanacrylic acid varies between 1.25 and 1.75 grams.

The products of several such operations are collected together and the mixture is stirred with twice its volume of a 5% sodium carbonate solution. It is then heated gently in a distillation flask which is connected to a condenser. A mixture of 2-vinylfuran and water distills at a temperature of approximately 80° C. The distillate is collected in a tube containing a small quantity of hydroquinone. The nearly colorless upper layer is separated and dried with calcium chloride and is distilled under reduced pressure. The 2-vinylfuran which distills over at 17° to 18° C.

at a pressure of 14 to 15 mm. of mercury is condensed in a U-tube that is surrounded with a freezing mixture at —20° C. and into which a small amount of hydroquinone (approximately 0.5%) has been previously placed. The boiling points of 2-vinylfuran at various pressures are as follows:

| | |
|---|---|
| 99 to 100° C | mm__ 760 |
| 49 to 50 | mm__ 130 |
| 32 to 33 | mm__ 57 |
| 25 | mm__ 27 |
| 19 | mm__ 17 |

The procedure adopted by Koton, Votinova and Florinskii (J. Applied Chem. (U. S. S. R.), 1941, vol. 14, pages 181–6; Chem. Abs., 1942, vol. 36, page 1604) was similar to that used by Moureu et al. except that a larger quantity of furanacrylic acid (100 grams) was heated in a flask at 250° to 275° C. The yield was reported to be 42% of 99.5% pure 2-vinylfuran and the residue was 45 grams of a brownish solid resin that was soluble in benzene and had a melting point of 102° C.

It is an object of the present invention to provide an improved process for the production of 2-vinylfuran and similar alkenylfurans.

It is a further object of the invention to provide a continuous process for the production of 2-vinylfuran and similar alkenylfurans by the decarboxylation of 2-furanacrylic and similar furanalkenyl carboxylic acids.

Other objects and advantages of this invention, some of which are referred to more specifically hereinafter, will be apparent to those skilled in the art to which the invention pertains.

In accordance with my invention, 2-furanacrylic acid or a similar furanalkenyl carboxylic acid is charged to a tube furnace, preferably in the liquid or molten state. The furnace is heated so that the temperature attained within the tube is within the range of approximately 250° to approximately 500° C., and preferably when 2-furanacrylic acid is pyrolyzed, within the range of 325° to 450° C. or 350° to 400° C. An inert diluent such as propane, ethane, methane or nitrogen is used to maintain a low partial pressure during the pyrolysis, although subatmospheric pressure may be used on the system. When an inert gas is used, a gas of high heat content, such as propane, is preferred. The time of contact is generally approximately 1 second or more and less than about 100 seconds, although this factor is quite variable and is dependent upon the temperature prevailing during the pyrolysis, the pressure and the characteristics of the particular material being pyrolyzed or decarboxylated. Many of the furanalkenyl carboxylic acids, particularly acids in which the alkenyl group is a branched chain, decarboxylate at a temperature lower than that of 2-furanacrylic acid.

The products of the pyrolysis are then quenched, preferably by external cooling, although they may be chilled by direct contact with inert cooling fluids, for example, propane, and separated. The undecomposed 2-furanacrylic acid or other furanalkenyl carboxylic acid is recycled to the tube furnace for further decomposition and the 2-vinylfuran or other alkenyl-furan is recovered. Any polymeric material recovered in the process may be recycled to the pyrolysis or may be subjected to depolymerization and recovered.

By operating in accordance with this general procedure, it is possible to obtain yields of alkenyl-furans in excess of 40% of the theoretical per pass, based on the furanalkenyl carboxylic acid charged. The amount of polymeric material that is produced in the pyrolysis is considerably reduced. The furanalkenyl carboxylic acid which is not decarboxylated in a single pass is recovered and resubjected to pyrolysis, together with polymeric material, if desired. It is not necessary in the practice of the present invention to maintain a high conversion per pass since it may be desirable to suppress the production of polymeric materials to a maximum by using shorter periods of contact, thereby sacrificing yield per pass.

Although the use of contact decarboxylation catalysts is not contemplated in certain embodiments of the process of my invention, such catalysts may be used in conventional manners, if desired.

Antioxidants and inhibitors of polymerization such as sulfur, hydroquinone, pyrocatechol and alkyl-substituted hydroquinones and pyrocatechols and alkylamines such as butyl and amyl-amines may be and preferably are used in the process of my invention. Small amounts of these materials may be added to the receivers for the alkenylfuran and to fractional distillation units in which the alkenylfuran is being treated. They may also be present in the vapors of the furanal-kenyl carboxylic acid that are being subjected to pyrolysis.

On the accompanying drawing is represented schematically an apparatus for practicing a preferred embodiment of the process of the present invention for the production of 2-vinylfuran from 2-furanacrylic acid. The furanacrylic acid is loaded into hopper 1 which is connected by means of barrel valve 2 to a screw conveyer 3 driven by a motor 4. The solid furanacrylic acid is conducted by means of the screw conveyer 3 to a melting tube 5 which is maintained at such a temperature that the furanacrylic acid is heated above its melting point. The molten acid is then charged to the pyrolysis tube 6 in furnace 7 where it is heated to a suitable pyrolysis temperature and maintained for a suitable time or period of contact. Propane or other inert gas is charged through inlet 8 to maintain the desired partial pressure of the furanacrylic acid in the pyrolysis tube.

The products of the pyrolysis leaving tube 6 are chilled in quencher 9, which is cooled externally, but quenching by direct contact with cold inert fluids as hereinbefore specified may be used instead. The products leaving the quencher are then charged to a fractionating column 10, preferably one operating under reduced pressure, in which a separation is made between 2-vinylfuran, undecomposed 2-furanacrylic acid and polymeric substances. The 2-vinylfuran, which is the overhead, is distilled through tube 11 and condensed in condenser 12 and collected in receiver 13. A vacuum pump may be applied to outlet 14 to provide the desired degree of vacuum and to remove vapors of carbon dioxide formed in the pyrolysis and propane or other inert gas which was used as diluent to maintain the desired pressure. This uncondensed inert gas may be recharged or recycled to the process at 8, after removal of carbon dioxide and other contaminants therefrom.

The 2-furanacrylic acid which is recovered in the fractional distillation unit 10 may be recycled through tube 15 by means of pump 16 together with the charge to the pyrolysis tube 6. Polymeric material may be removed from the bottom of the fractionating unit 10 by means of valve 11.

The representation of the apparatus on the accompanying drawing is diagrammatic only and it is to be understood that heaters, condensers, pumps, for producing both superatmospheric and subatmospheric pressures and for conveying liquids and other fluids, as well as other conventional pieces of equipment or apparatus are contemplated in the assembly for practicing the process of the invention.

Although the furanacrylic acid is represented as being charged to a screw conveyer and then to a melter or preheater, it is to be understood that it may be charged in the form of a vapor or in the form of a liquid by other methods. For example, the acid may be liquefied by heating and then charged by aspiration or atomization with or without the use of propane, nitrogen or other inert gas, to the pyrolysis tube.

In the practice of the process of the invention the pressure of the furanalkenyl carboxylic acid during the pyrolysis is maintained below that of the normal atmosphere, and preferably below ½ atmosphere (380 mm. of mercury). This subatmospheric pressure may be obtained by the use of suitable pumps or by means of an inert diluent such as propane, ethane, methane or nitrogen.

An example of a method of practicing the process of my invention is as follows:

2-furanacrylic acid is heated to approximately 200° C. in a distillation flask and through this molten mass is charged a stream of propane gas at a rate of approximately 25 cc. per second by means of a tube extending to the bottom of the flask. The mixture of furanacrylic acid vapors and propane are led into a Pyrex glass tube which is approximately 3 feet in length and 2 centimeters in internal diameter that is heated to and maintained at approximately 350° C. The contact time is within the range of approximately 3 to 12 seconds. The issuing vapors are then cooled in a water-cooled condenser and collected. The resulting condensate is fractionally distilled at a pressure of approximately 20 mm. of mercury to recover 2-vinylfuran. The yield is approximately 50% of the theoretical calculated on the weight of the furanacrylic acid charged. The recovered furanacrylic acid may be recycled to the molten mixture in the distillation flask.

By varying the temperature of the molten furanacrylic acid in the distillation flask, varying amounts of the acid may be mixed with the propane gas and different partial pressures of the furanacrylic acid during the pyrolysis may be obtained. Other inert gases may be used in a similar manner for establishing desired pressures.

Although the foregoing example is illustrative it is not to be understood to limit the invention in any way nor is it to be understood to constitute an embodiment of optimum conditions of practicing the process of this invention.

The 2-furanacrylic acid which is used for the production of 2-vinyl-furan according to the present invention may be produced by various methods. Either the stable form which has a melting point of 141° C., or the labile form, which has a melting point of 103° to 104° C., may be used. 2-furanacrylic acid is also known as beta-(2-furyl)-acrylic acid and furfurylidene-acetic acid. For use in the process of the present invention the acid need not be of high purity but may be crude acid, for example, that which has been obtained in accordance with the well-known Perkin reaction by heating furfural, fused sodium acetate and acetic acid anhydride at a temperature of 160° C. or thereabout and recovered from said reaction mixture by a single crystallization from water, benzene or petroleum naphtha, without further purification. The 2-furanacrylic acid which is obtained by the Perkin reaction is predominantly the stable form having a melting point, when pure, of 141° C. and a boiling point of 286° C.; the acid has been observed to sublime at 112° C. in a high vacuum and when heated rapidly in small amounts to boil and distill between 255° and 265° C. (See Baeyer, Berichte, 1877, vol. 10, page 357; Marckwald, Berichte, 1887, vol. 20, page 2812; Gibson and Kahnweiler, Amer. Chem. J., 1870, vol. 12, page 314; Moureu et al., loc. cit., and Koton et al., loc. cit.)

For the production of other furylalkenes, the corresponding furanalkenyl carboxylic acids may be used. The furanalkenyl carboxylic acids may be substituted by alkyl, halogen or other radicals in the furan nucleus or in the alkenyl radical. The substitution in the furan nucleus may be on either the 2 or 3 carbon atom. A number of these are known and have been prepared by the Perkin reaction and by other reactions, for example, by the oxidation of the corresponding aldehydes. Since the preparation of these acids does not constitute a part of my invention, their preparations will not be described in detail. However, it is to be noted that the Perkin reaction is adaptable only to the preparation of furanalkenyl carboxylic acids in which the alkenyl radical is a normal or unbranched chain. The reaction of furfural with potassium isobutyrate and isobutyric anhydride yields isobutenylfuran (furylisobutylene) instead of the corresponding acid, which is obtained only in traces (Baeyer and Tönnies, Berichte, 1877, vol. 10, page 1364, and Tönnies and Staub, ibid., 1884, vol. 17, page 851), and furfural when heated with sodium isovalerianate and isovalerianic anhydride yields isoamylfuran (furylisoamylene) together with only traces of the corresponding acid (Schaarschmidt, Georgeacopol and Herzenberg, Berichte, 1918, vol. 51, page 1068). "Furylangelic" acid, also known as alpha-ethyl-beta-(alpha-furyl)-acrylic acid, alpha-furfurylidene-butyric acid and 2-furan-alpha-ethylacrylic acid, has been obtained by the Perkin condensation in 80% yield (Carter, J. Amer. Chem. Soc., 1928, vol. 50, page 2301). 5-methyl-2-furanacrylic acid, also known as beta-(5-methyl-2-furyl)-acrylic acid and (5-methyl-furfurylidene)-acetic acid, has been obtained by the Perkin reaction by condensation of 5-methyl-furfural with sodium acetate and acetic anhydride (Maquenne, Annales chim. phys., 1891, Series 6, vol. 22, page 87).

The following are some of the known furanalkenyl carboxylic acids. In representing their structural formulae, the furan nucleus has not been set forth in detail.

2-furanacrylic acid, also known as 2-furanpropenoic acid, beta-(2-furyl)-acrylic acid and furfurylidene-acetic acid:

Furan—(2)—CH=CH—COOH

Stable form:
    Melting point: 141° C.
    Sublimes at 112° C. in high vacuum
    Boiling point: 286° C.
Labile form:
    Melting point: 103°–104° C.

5-methyl-2-furanacrylic acid, also known as 5-methyl-2-furanpropenoic acid, beta-(5-methyl- 2-furyl)-acrylic acid and (5-methyl-furfurylidene)-acetic acid:

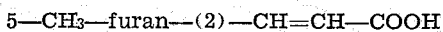

Melting point: 157° C.

2-furan-alpha-methylacrylic acid, also known as 2-furan-alpha-methylpropenoic acid, beta-(alpha-furyl)-methylacrylic acid and alpha-furfurylidene-propionic acid:

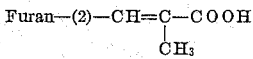

Melting point: 107° C.

2-furan-alpha-ethylacrylic acid, also known as Baeyer's furylangelic acid (which is a misnomer), 2-furan-alpha-ethylpropenoic acid, alpha-ethyl-beta-(alpha-furyl)-acrylic acid, and alpha-furfurylidene-butyric acid:

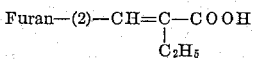

Melting point: 87°–88° C.

2-furan-alpha-isopropylacrylic acid, also known as alpha-isopropyl-beta-(2-furyl)-acrylic acid and alpha-furfurylidene-isovalerianic acid:

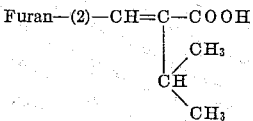

Melting point: 114° C.

The following alkenylfurans, which are known, as well as other similar compounds, may be made according to the process of the invention.

2-vinylfuran, also known as alpha-furylethylene

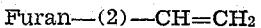

Boiling point: 99° to 101° C. (also see data hereinabove)
Melting point: —94° C.

2-isobutenylfuran, also known as alpha-furylisobutylene, 2-(2-metho-2-propenyl)-furan, and beta-methyl-alpha-(alpha-furyl)-alpha-propylene:

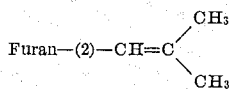

Boiling point: 153° C.

2-pentenylfuran, also known as alpha-furylamylene, 2-(2-etho-2-propenyl)-furan and gamma-(alpha-furyl)-beta-amylene:

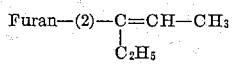

Melting point: 249° C.

2-isopentenylfuran, also known as alpha-furylisoamylene, 2-(gamma-methyl-alpha-butenyl)-furan and gamma-methyl-alpha-(alpha-furyl)-alpha-butylene:

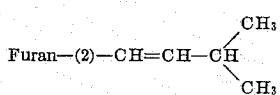

Boiling point:
165° to 167° C.
64° to 66° C. (at 13 mm.)

2-vinylfuran and other alkenylfurans which can be obtained by the process of the present invention may be readily polymerized to products which are useful as plastics and which can be molded under heat and pressure and which are thermoplastic as contrasted to thermosetting plastic materials. They are also useful in the form of copolymers with 1,3-butadiene (erythrene), isoprene (2-methyl-1,3-butadiene) and piperylene (1,3-pentadiene), respectively, as "synthetic rubbers," namely, products which possess a high elasticity and resemble natural rubber in other respects. Such copolymers even surpass natural rubber in some properties.

Inasmuch as the foregoing description comprises preferred embodiments of the invention it is to be understood that the invention is not limited thereto and that modifications and alterations may be made therein without departing substantially from the invention as defined in the appended claims.

I claim:

1. A process for the prdouction of 2-vinylfuran from 2-furanacrylic acid which comprises continuously charging vapors of 2-furanacrylic acid to the inlet end of a closed elongated reaction zone of restricted cross section such that flow in said zone is confined to one general direction from the inlet to the outlet end thereof, continuously passing said vapors of 2-furanacrylic acid through said zone from the inlet to the outlet end thereof while subjecting same to a temperature within the range of about 325° C. to about 450° C., continuously withdrawing effluent comprising 2-vinylfuran and unreacted furanacrylic acid from the outlet end of said zone, and separating said 2-vinylfuran from said effluent.

2. A process for the production of 2-vinylfuran from 2-furanacrylic acid which comprises continuously charging said 2-furanacrylic acid in vapor phase to the inlet end of a reaction tube having a relatively small cross-sectional area in proportion to its length, continuously passing the vapors of 2-furanacrylic acid from the inlet to the outlet of said reaction tube while subjecting same to a temperature within the range of about 325° C. to about 450° C. for a period of time within the range of about 1 to about 100 seconds, continuously withdrawing effluent comprising 2-vinylfuran and unreacted 2-furanacrylic acid from the outlet end of said reaction zone, and separating said 2-vinylfuran from said effluent.

3. A process for the production of 2-vinylfuran from 2-furanacrylic acid which comprises continuously charging a mixture of said 2-furanacrylic acid vapors and a gaseous carrier which remains gaseous and undecomposed in the process into the inlet end of a reaction tube having a relatively small cross-sectional area in proportion to its length, continuously passing said mixture from the inlet to the outlet of said reaction tube while subjecting same to a temperature within the range of about 325° C. to about 450° C. for a period of time within the range of about 1 to about 100 seconds, continuously withdrawing effluent comprising 2-vinylfuran together with said gaseous carrier and undecomposed 2-furanacrylic acid, and separating 2-vinylfuran from said effluent.

4. A process as defined in claim 3 characterized in that the gaseous carrier is propane.

5. A process for the production of 2-vinylfuran from 2-furanacrylic acid, which comprises heating 2-furanacrylic acid to a temperature of about 200° C., passing vaporous propane as a gaseous carrier through said heated 2-furanacrylic acid thereby forming a mixture of vapors of propane and 2-furanacrylic acid, passing said mixture continuously into the inlet of a reaction tube having a relatively small cross-sectional area in proportion to its length, continuously passing said mixture from the inlet to the outlet of said reaction tube while subjecting same to a temperature of about 350° C. for a period of time within the range of from about 3 to about 12 seconds, continuously withdrawing effluent comprising 2-vinylfuran together with said gaseous carrier and undecomposed 2-furanacrylic acid, and separating 2-vinylfuran from said effluent.

CARY R. WAGNER.

REFERENCES CITED

The following references are of record in the file of this patent:

UNITED STATES PATENTS

| Number | Name | Date |
|---|---|---|
| 2,229,997 | Claborn | Jan. 28, 1941 |
| 2,341,016 | Brubaker | Feb. 8, 1944 |
| 2,335,808 | Soule | Nov. 30, 1943 |
| 2,309,457 | Hutchinson et al. | Jan. 26, 1943 |